May 20, 1958 C. E. HOCKERT 2,835,342
AIR INLET SCREENS

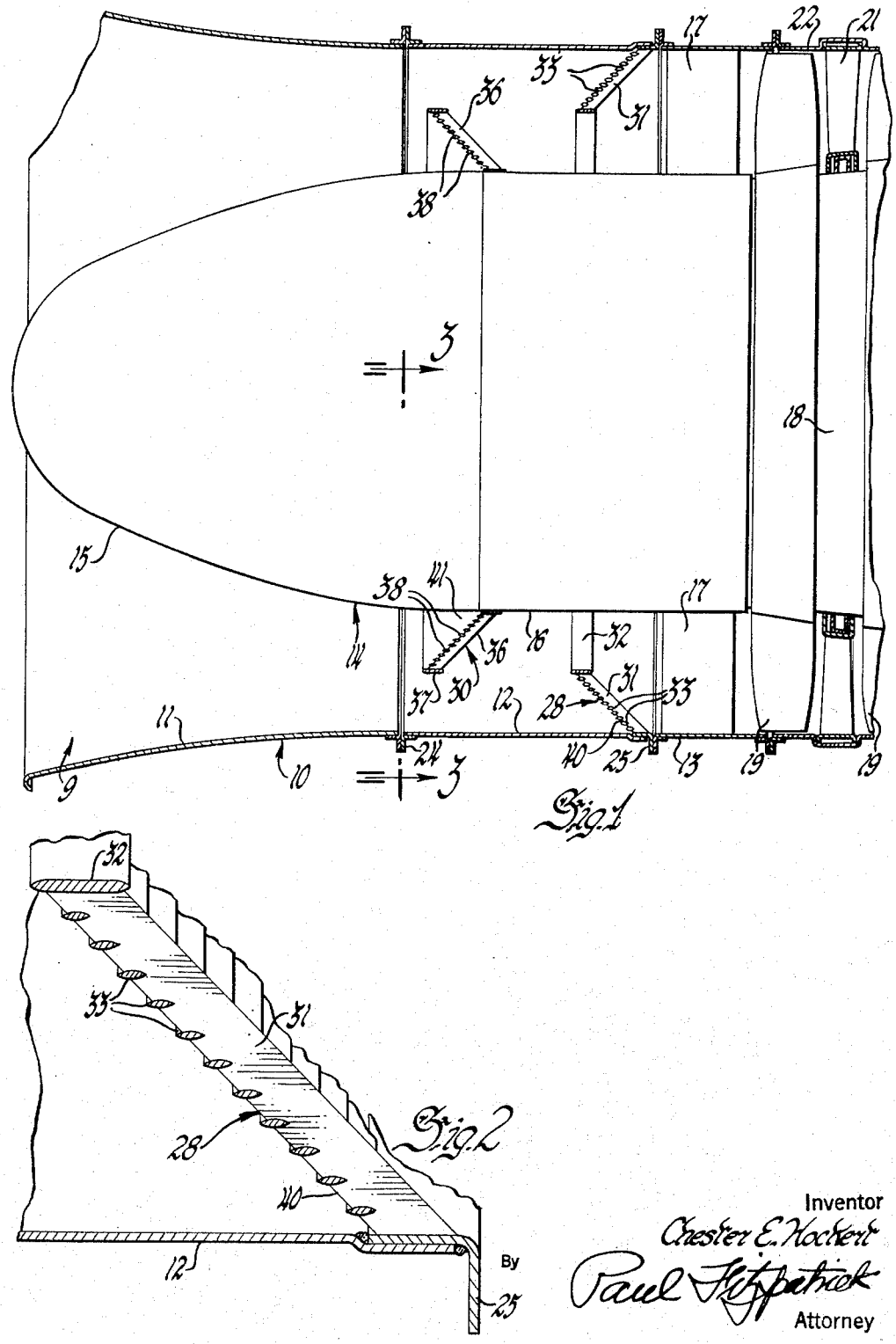

Filed Aug. 9, 1954 2 Sheets-Sheet 2

Inventor
Chester E. Hockert
By Paul Fitzpatrick
Attorney 2,835,342
Patented May 20, 1958

2,835,342
AIR INLET SCREENS

Chester E. Hockert, Indianapolis, Ind., assignor to General Motors Corporation, Detroit, Mich., a corporation of Delaware Application August 9, 1954, Serial No. 448,520

2 Claims. (Cl. 183—70)

This invention relates to fluid ducts, more particularly to the air intake of a gas turbine engine, with particular relation to the protection of the engine or other apparatus supplied through the duct from foreign matter.

It is customary to provide the air intakes of gas turbine aircraft engines with screens to protect the engines from foreign matter carried in by the entering air. The presence of these screens creates the problem that ice may be deposited upon them so as to strangle the engine. Because of this, various proposals for retractable screens and for heating or otherwise deicing the inlets have been advanced. The object of this invention is to provide a simple and effective screen structure which need not be retracted and which is incapable of throttling the engine even though ice builds up on the screens. The objects of the invention are to protect machinery such as gas turgine engines from foreign matter and to provide screens for an air duct or the like which cannot be completely closed by foreign matter accumulating thereon.

Briefly, the invention is put into effect by providing screens in the duct, each of which covers, obstructs, or occludes only part of the duct, but with the several screens so disposed so that any normal streamline, that is, a streamline of flow extending through the duct under normal conditions, with the screens unobstructed, will pass through one of the screens. The screens are spaced longitudinally of the duct, however, so as to provide a rather large gap between them so that if the screens are obstructed the air can flow around the screens and through the gap between them. Because of the high velocity of the air entering an aircraft gas turbine engine the air will normally pass through the screens so that foreign matter will be intercepted, unless the screens are blocked, forcing the air to flow in a sinuous path between the screens rather than through them.

The nature and advantages of the invention and the structure of the preferred embodiment thereof will be more thoroughly apparent from the succeeding description and claims and the accompanying drawings in which:

Fig. 1 is a more or less diagrammatic representation of the air intake end of a typical gas turbine engine with inlet screens according to the invention mounted therein, the view being taken in section on a plane containing the axis of the engine.

Fig. 2 is an enlarged view of a portion of one of the screens taken on the same plane as Fig. 1.

Fig. 3 is a partial front elevation view of the air inlet illustrating the overlapping screens, taken on the plane indicated in Fig. 1.

Figure 5:
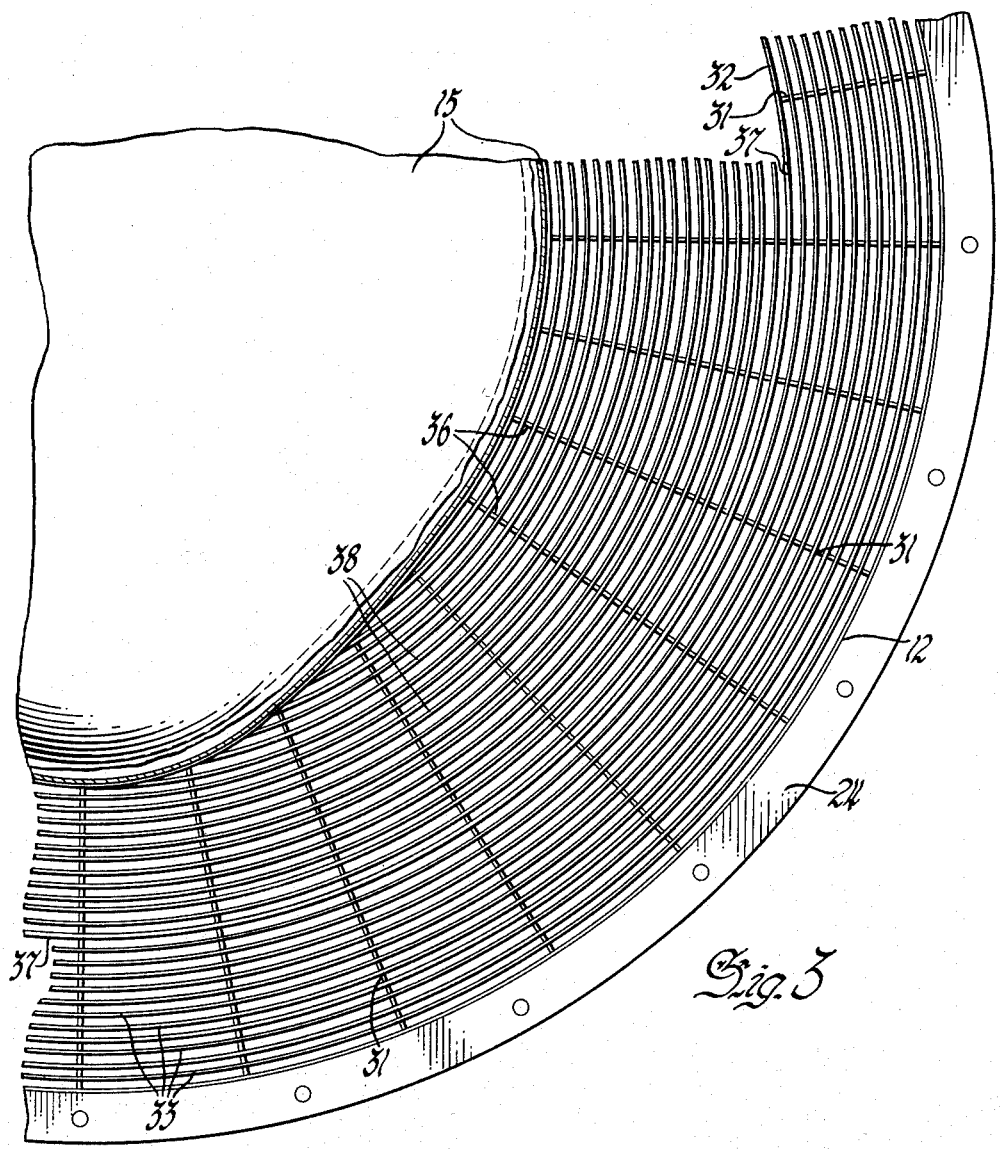

Referring now to the drawings, it will be understood that Fig. 1 is not intended to show details of a gas turbine engine or a compressor in a realistic manner since the detailed structure of the compressor is not material to the invention and the invention may be employed with compressors of various types. An annular air intake leading to the compressor of the gas turbine engine is defined by an outer wall 10, formed by sections 11, 12, and 13, and an inner wall 14 defined by nose section 15 and a generally cylindrical portion 16. The nose 15 may be mounted on the inner wall 16 which latter is supported from the outer wall portion 13 by struts 17 which may serve as inlet guide vanes for a compressor, shown as one of the axial flow type including a rotor 18 having blades 19 thereon which cooperate with stationary vanes 21 mounted in the casing 22 of the compressor. The bearing (not shown) for the forward end of the compressor rotor may be supported by the struts 17 in known manner. As will be apparent from Fig. 3, the duct 9 is of an annular character although not in the most limited sense of the term, since the inner wall is not circular in cross section. The several sections 11, 12, 13, and 22 of the outer wall structure may be assembled together in any suitable manner, as by bolting flanges such as the flanges 24 and 25 shown in Figs. 2 and 3. Extending from the opposed outer and inner wall sections 12 and 16 are two screens indicated generally as 28 and 30, each of which is annular. The screen 28 comprises a number of radial ribs 31 extending from the flange 25 to an inner boundary ring 32 and a number of closely spaced parallel wires 33 of streamlined form mounted in notches in the leading edges of the struts 31. This entire assembly may be welded together and the flange 25 may be welded to the duct section 12.

The screen 30 is of similar construction comprising struts 36 extending outwardly from the inner wall section 16, an outer boundary ring 37, and wires 38 extending circumferentially of the screen mounted on the struts. As will be most clearly apparent from Fig. 3, the boundary ring 32 lies immediately behind the ring 37 so that the screens overlap very slightly and the entire area of the duct is occluded by the screens so that any normal streamline through the passage will pass through one or the other of the screens; thus, any foreign objects sufficiently large to be dangerous to the blades of the compressor entering the engine with the high velocity air flow will strike one or the other of the screens. As will be apparent, the struts 31 and 36 extend forwardly into the air stream so that a trap or pocket 40 or 41 is provided at the base of each screen into which these large pieces of foreign matter will be drawn by the air stream. It will be apparent the spacing of the two rings 32 and 37 longitudinally of the duct is quite substantial and, in fact, is sufficient that the area of the cylinder between the two rings is approximately equal to the area of the cross section of the annular duct. Therefore, if the screens 28 and 30 are quite substantially obstructed by foreign matter, such as ice forming on the screens, it will be possible for the air to flow around the outside of the screen 30, through the gap between the screens, and around the inner edge of screen 28. While this will present some interference with the air flow, the interference would not be sufficient to affect seriously the engine; whereas, experience has shown that icing on conventional screens can disable or destroy an engine in a very short time by shutting off the air flow to it.

The preferred embodiment of the invention has been illustrated and described in order to explain the principles thereof. It will be apparent to those skilled in the art that many modifications of the structure may be made within the principles of the invention which is not to be regarded as limited by the detailed description of the preferred embodiment.

I claim:

1. In an air-breathing engine, in combination, opposed outer and inner walls defining an annular air intake duct for the engine through which air flows at high velocity during operation of the engine and a plurality of screens mounted in the duct, one of said screens extending into the duct from the outer wall and terminating short of the inner wall and the other of said screens extending into the duct from the inner wall and terminating short of the outer wall, so that each screen obstructs a part only of the area of the duct, and the screens overlapping on the cross-section of the duct and jointly covering the cross-section of the duct so that any streamline through the duct under normal conditions with the screens unobstructed will pass through one of the screens, the screens being spaced longitudinally of the duct to provide a sinuous path for air flow between the screens in the event of obstruction of the screens.

2. A combination as recited in claim 1 in which the screens extend in an upstream direction into the duct from the walls.

References Cited in the file of this patent

UNITED STATES PATENTS

| | | |
|---|---|---|
| 568,735 | Bright | Oct. 6, 1896 |
| 1,328,868 | Ashby | Jan. 27, 1920 |
| 1,716,481 | Bilsky | June 11, 1929 |
| 1,769,071 | Raney | July 1, 1930 |
| 2,534,138 | Marshall | Dec. 12, 1950 |
| 2,546,153 | DeRemer | Mar. 27, 1951 |
| 2,623,610 | Buechel | Dec. 30, 1952 |